United States Patent Office 2,929,806
Patented Mar. 22, 1960

2,929,806

HYDRONOPYL ACRYLATE, POLYMERIC DERIVATIVES THEREOF, AND METHOD FOR PRODUCING THE SAME

Carl S. Marvel, Urbana, Ill., and Roland Schwen, Ludwigshafen (Rhine), Germany, assignors to the United States of America as represented by the Secretary of Agriculture No Drawing. Application August 1, 1957
Serial No. 675,783

34 Claims. (Cl. 260—80.7)

This invention relates to a new ester, hydronopyl acrylate, and to certain polymeric derivatives thereof. More particularly, the invention relates to hydronopyl acrylate, homopolymers thereof, and copolymers of hydronopyl acrylate and one or more unsaturated polymerizable compound.

Polymers obtained by copolymerizing hydronopyl acrylate with one other polymerizable compound will be referred to hereinafter as "copolymers" and polymers obtained by copolymerizing hydronopyl acrylate with two other polymerizable compounds will be referred to as "terpolymers."

Hydronopol is a cyclic alcohol derivative of beta-pinene, and has the formula,

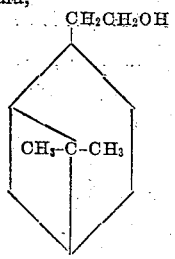

This alcohol may be produced by hydrogenating nopol, an unsaturated cyclic alcohol obtained by reacting beta-pinene with formaldehyde. Methods for producing these cyclic alcohols are disclosed by Bain, J. Amer. Chem. Soc., vol. 68, pp. 638–641 (1946).

According to this invention, when hydronopol is esterified to form the acrylate, there is obtained a compound having valuable properties as an intermediate for the production of polymeric plasticizers and certain resinous derivatives. Thus, the homopolymers of hydronopyl acrylate have been found to be plasticizers for vinyl chloride resins; while copolymers of hydronopyl acrylate with styrene, vinyl chloride, acrylonitrile, or butadiene, and terpolmers of hydronopyl acrylate, butadiene, and either styrene or acrylonitrile produce resinous products. The copolymers are internally plasticized resins and also form a latex for latex-based paints, while the terpolymers form oil-resistant rubbery materials having a tensile strength considerably higher than that of the conventional acrylonitrile-butadiene rubber.

Hydronopyl acrylate is produced by reacting hydronopol with acrylyl chloride or with acrylic acid.

When esterification is carried out by. means of acrylyl chloride it is necessary to add a basic substance to the reaction mixture to remove the hydrochloric acid formed during the reaction. Amines are particularly suitable since they form water-soluble hydrochlorides which are easily removed.

When hydronopol is reacted directly with acrylic acid, an esterification catalyst is desirable. Any of the conventional catalysts can be used for the purpose, as for example, p-toluene-sulfonic acid. It is also possible to use an insoluble acid catalyst, such as, an acid ion exchange resin. When carrying out the esterification using acrylic acid, it is desirable to add a polymerization inhibitor, such as, hydroquinone or ferrous ammonium sulfate, to the reaction mixture.

PREPARATION OF HYDRONOPYL ACRYLATE

*Example 1*

(a) *Preparation of acrylyl chloride.*—Into a 3 liter three-necked flask fitted with a reflux condenser, a stirrer, and a dropping funnel there were placed 690 grams (9.6 moles) of glacial acrylic acid. Stirring was started and 1050 grams (8.8 moles) of thionyl chloride were added through the dropping funnel over a period of three hours. The reactants were protected from atmospheric moisture by calcium chloride drying tubes during the course of the reaction, and were cooled with a stream of water until the addition of thionyl chloride was completed. The reaction mixture was refluxed for seven hours and then distilled. The fraction boiling between 65–78° C. was collected (300 grams). This fraction was redistilled, giving two fractions, one boiling between 65 and 72.5° C. (20 grams) and the other boiling between 72.5 and 74° C. (158 grams). The product was stored at Dry Ice temperature until it was used.

(b) *Preparation of hydronopyl acrylate.*—Into a 2 liter three-necked flask were placed 210 grams (1.25 moles) of hydronopol, 169 grams (1.35 moles) of N,N-dimethylaniline, and 200 ml. of anhydrous ethyl ether. The flask was fitted with a stirrer, reflux condenser, dropping funnel, and calcium chloride drying tube. The contents of the flask were heated to reflux temperature, the heat source removed, and 129 grams (1.43 moles) of acrylyl chloride were added at a rate sufficient to maintain a gentle reflux. When the amine hydrochloride began to crystallize, addition of acrylyl chloride was stopped and the mixture was cooled in an ice-water bath until the vigorous refluxing ceased. The remainder of the acrylyl chloride was then added, the mixture heated on a steam bath for two hours, and then cooled. 200 ml. of water were added to dissolve the precipitated amine hydrochloride. The reaction mixture was extracted with three 50 ml. portions of cold 10% sulfuric acid, with 100 ml. of saturated sodium bicarbonate and with 100 ml. of deionized water, dried over anhydrous magnesium sulfate for one hour, and over Drierite overnight. The crude material was stored at −10° C.

To purify the hydronopyl acrylate, the crude ester, produced above, was stored over sodium for 24 hours and then distilled. The recovered product was a yellow oil having the following properties: B.P. 73°/0.05 mm.; $n_D^{25}$ 1.4800.

*Analysis.*—Calculated: C, 75.63; H, 9.98. Found: C, 75.50; H, 9.82; and C, 75.74; H, 9.95.

*Example 2*

(a) Crude acrylic acid was diluted with sufficient toluene and refluxed over hydroquinone with a water separator until all water was removed. It is important that the water separator cools the toluene-water-acrylic acid mixture down to room temperature, otherwise no separation is obtained. The product was then distilled; B.P.<143° (B.P. of monomeric acrylic acid) and stored at 0° C. over hydroquinone. The amount of acrylic acid is determined by means of a 1 N sodium hydroxide solution.

(b) Two hundred ten (210) grams of hydronopol (1.25 moles) plus 325 ml. 4.6 N acrylic acid-toluene solution (1.5 moles) plus 25 g. hydroquinone (using less hydroquinone, the mixture foams during distillation) plus 2 g. p-toluenesulfonic acid (without this acid the reaction runs much slower) plus copper wire were refluxed. After 7 hours 25.5 ml. of water (theoretical 22.7 ml.) separated.

(c) To purify the crude ester water is dropped continuously through the reaction mixture until p-toluenesulfonic acid, the surplus of acrylic acid (pH) and hydroquinone (wash-water must not turn yellow with a pill of potassium hydroxide) is removed. Then the ester-toluene solution is dried over magnesium sulfate (and copper wire for inhibition), the toluene removed under vacuum and the ester distilled (from copper wire): B.P. 77–78° C./0.1 mm., yield 222 g. (80%), almost colorless oil; $n_D^{23.5}$ 1.4804.

*Example 3*

Hydronopyl acrylate was also prepared using an insoluble and low vapor pressure inhibitor (such as, ferrous ammonium sulfate) and an insoluble acid catalyst (such as, an acid ion exchange resin).

Thus, 168 grams of hydronopol (1.0 mole), 89.0 grams of acrylic acid (1.24 mole), 200 ml. of toluene, 10 grams of Dowex 50–X8, 400 mesh (a polystyrene-sulfonic acid ion exchange resin containing about 53% water), and 10 grams of ferrous ammonium sulfate (37% water) were heated under reflux for 24 hours. Using a water separator, 29 ml. of water were removed during this time. After decantation, the toluene was distilled under vacuum, and the crude ester was distilled at 0.01 mm., yielding 181 grams (81% of theoretical) of a colorless oil boiling at 71–73° C., $n_D^{26}$ 1.4788.

To show that hydronopol does not rearrange during esterification or saponification, 14 g. of pure of hydronopyl acrylate were saponified with 4 g. of solid potassium hydroxide, dissolved in 20 g. of ethanol (copper wire as inhibitor), by refluxing this mixture for 6 hours. The crude product was dried over magnesium sulfate and distilled under vacuum: B.P. 128°/12 mm., yielding 3.5 g. of a colorless oil, $n_D^{23}$ 1.4862. The infrared spectra obtained from starting material and from this product do not show any differences.

HOMOPOLYMERIZATION OF HYDRONOPYL ACRYLATE

*Example 4*

The ester produced in Example 1 was heated with benzoyl peroxide at a temperature of 105° C. for 20 minutes, yielding a half-solid homopolymer.

*Example 5*

The ester produced in Example 2 was heated with benzoyl peroxide at a temperature of 120° C. for 10 minutes, yielding a semi-solid homopolymer.

*Example 6*

The ester produced in Example 3 was heated for five minutes at 130° C., using benzoyl peroxide as the initiator. A colorless homopolymer was obtained.

The following examples show the emulsion homopolymerization of hydronopyl acrylate.

All polymerizations, including the production of the copolymers and terpolymers, were carried out in four-ounce screw-cap bottles, which were tumbled end-over-end in a water bath. The following kinds of soap were used:

A. ORR soap: 80 g. of ORR soap and 2720 ml. of distilled water, dissolved at 50° C.

B. Resin 731, Hercules Powder Co. (a disproportionated rosin) (26.7 g.) was ground in a mortar, and 3.54 g. of NaOH, and 300 ml. of distilled water were shaken with the resin until all resin was dissolved, diluted with water to 1.0 liter; pH 11.

C. Ground dehydrogenated "K" wood rosin, no heat treatment, Hercules Powder Co. (13.4 g.) was dissolved in 200 ml. of ethanol at room temperature, 1.57 g. of NaOH, dissolved in 35 ml. of water was added and the mixture dried with hot, circulating air. The sodium salt (2.86 g.) was dissolved in 100 ml. of water, pH=9.0.[4]

A freshly prepared 3% aqueous solution of potassium persulfate served as the initiator, and the modifier was lauryl mercaptan.

The ORR soap mentioned above is a silicate free and linoleic and linolinic acid free soap used in the production of GRS rubber.

After polymerization, an antioxidant (300 g. of phenyl-β-naphthyl amine, 75 g. of ORR soap and 2625 g. of distilled water) was added and the emulsion coagulated with sodium chloride coagulant (787.5 g. of sodium chloride, 2250 ml. of water, 53.3 ml. of sulfuric acid).

In order to remove the soap, the polymers were washed carefully with water and sometimes with methanol, and dried over calcium chloride and paraffin under vacuum.

For microanalysis, the products were dissolved and reprecipitated.

For the determination of the viscosities, approximately 0.12 g. of polymer was dissolved in about 50 ml. of benzene or chloroform, the solution filtered if necessary, and viscosity and solubility determined in the usual manner at 25° C.

Melting points were determined at a hot metal surface (Kofler bench).

The following table gives the results of a number of homopolymerizations:

TABLE I

| Example No. | Soap g. | Soap Kind | Initiator, ml. | Monomer, g. | $N_2$[1] | Temp., °C. | Time, Hrs. | Viscosity, η 25 | Remarks |
|---|---|---|---|---|---|---|---|---|---|
| 7 | 35 | A | 10 | 20 | ----- | 50 | 21 | ----- | Still oily. |
| 8 | 50 | A | 10 | 15 | + | 50 | 18 | 0.65 | 18 g. of brown, tough-sticky polymer, soluble in benzene. |
| 9 | 35 | B | 2 | 10 | + | 50 | 16 | ----- | Sticky, oily. |
| 10 | 35 | B | 10 | 10 | + | 50 | 16 | 0.35 | Solid brown; soluble in benzene. |
| 11 | 35 | C | 2 | 10 | + | 50 | 16 | ----- | Oily. |
| 12 | 35 | C | 10 | 10 | + | 50 | 16 | 0.33 | Solid brown; soluble in benzene. |

[1] In all but Example 7, the polymerizations were carried out after first flushing the mixture in the bottles with nitrogen.

The above described homopolymers are plasticizers for vinyl chloride resins.

COPOLYMERIZATION OF HYDRONOPYL ACRYLATE

In the following examples, relating to both the copolymers and the terpolymers, where exact monomer weights are given and one of the monomers is gaseous, the bottles were filled using the following technique: The bottle was weighed with soap, initiator, and modifier to the nearest 0.01 g., monomer I was added with a pipette, and the bottle was weighed again. Then monomer II was added, the mixture flushed with nitrogen for 60 seconds, and weighed. (When monomer II is volatile, e.g. acrylonitrile, some material is lost during flushing with nitrogen.) Finally, an excess of the gaseous, condensed monomer III is added. The last traces of air are removed by evaporating the excess monomer III, and the bottle is closed tightly and weighed again.

The vinyl chloride, before being used, was first washed with 50% alkali, dried over calcium chloride and condensed with Dry Ice.

Example 13

Thirty-five grams ORR soap, 5 g. hydronopyl acrylate, 2 ml. 3% potassium persulfate (freshly prepared aqueous solution), and 10 g. vinyl chloride were heated at 50° C. for 15 hours and 45 minutes in closed bottles which were tumbled end-over-end. After cooling the bottles were still under slight pressure. The emulsion was coagulated with 25 ml. coagulant (100% sulfuric acid, saturated with sodium chloride) and the polymer was cut in small pieces and washed with water and methanol, yielding 12 g. of a brittle substance after drying. It merely swells in benzene.

Example 14

Thirty-five grams ORR soap, 10 g. hydronopyl acrylate, 10 ml. 3% potassium persulfate solution, and about 10 g. vinyl chloride were heated at 50° C. for 15 hours and 30 minutes. The reaction mixture was treated as in Example 13. After drying it yielded 19 g. of brittle polymer which is almost insoluble in benzene (swells only).

Example 15

Thirty-five grams of ORR soap, 15 g. hydronopyl acrylate, 10 ml. 3% potassium persulfate solution, and 5 g. of vinyl chloride were heated at 50° C. for 16 hours. After cooling, the bottles were free of pressure. The polymer was recovered as in Example 13. The crude material was tough and elastic. After washing with water and methanol and then drying, a tough, thermoplastic material is obtained. It is somewhat elastic, and has a viscosity of 1.1 (25° C.).

Example 16

Fifty grams of ORR soap, 15 g. of hydronopyl acrylate, 5 g. of vinyl chloride, and 10 ml. of 3% potassium persulfate were sealed into a bottle from which the air had been removed by flushing with nitrogen. The bottle was heated, while being tumbled, at 50° C. for 18 hours. After cooling, the emulsion was broken by means of 35 ml. of coagulant, washed with water and methanol, and then dried. 18 g. of a brown, tough, plastic, elastic material were obtained, which had a viscosity of 0.65 (25° C.).

The following examples illustrate the copolymerization of hydronopyl acrylate with butadiene.

Before being used, the butadiene was dried over calcium chloride and condensed with Dry Ice.

Copolymerizations were carried out by the same techniques as described for vinyl chloride. The specific recipes, conditions, and results are summarized in Table II.

TABLE II.—HYDRONOPYL ACRYLATE-BUTADIENE COPOLYMERS

| Example No. | Soap, g. | Soap, Kind | Initiator, ml.[2] | Modifier, mg.[1] | Hydronopyl Acrylate, g. | Nitrogen | Butadiene, g. | Temp., °C. | Time, Hrs. | Conversion, Percent | Viscosity, η 25 | Remarks |
|---|---|---|---|---|---|---|---|---|---|---|---|---|
| 17 | 35 | C | 20 | | 9.5 | + | 0.5 | 50 | 22 | | | Tough material, swells with solvents. |
| 18 | 35 | B | 10 | | 5 | + | 5 | 50 | 65 | | | Oily, sticky. |
| 19 | 35 | B | 2 | 30.8 | 4.87 | + | 4.63 | 50 | 39 | 81 | 1.19 | Soft, sticky material, partially soluble in chloroform: Anal.—Found: C, 82.05; H, 10.60. Calcd. monomer mixture: C, 82.06; H, 10.57. |
| 20 | 35 | B | 2 | 30.8 | 4.88 | + | 4.93 | 50 | 39 | 74 | | Soft, sticky material, swells with chloroform. |
| 21 | 35 | B | 5 | 15.4 | 4.90 | + | 5.11 | 60 | 70 | ~100 | | Rubbery material, swells with chloroform. |
| 22 | 35 | B | 5 | 30.8 | 4.91 | + | 4.95 | 60 | 70 | ~100 | | Do. |

[1] Lauryl mercaptan.
[2] Potassium persulfate.

The following examples illustrate the copolymerization of hydronopyl acrylate with styrene. The procedures were the same as for the copolymerization with vinyl chloride.

Before being used, the styrene was distilled from copper wire; and the fraction boiling at 143–146° C. was recovered.

In order to remove air, all samples were flushed with nitrogen for 60 seconds. The specific recipes, conditions, and results are summarized in Table III.

TABLE III.—HYDRONOPYL ACRYLATE-STYRENE COPOLYMERS

| Example No. | Soap A, ml. | Initiator, ml.[1] | Modifier, mg.[2] | Hydronopyl Acrylate, g. | Styrene, g. | Temp., °C. | Time, Hrs. | Conversion, Percent | Viscosity, η 25 | Remarks |
|---|---|---|---|---|---|---|---|---|---|---|
| 23 | 50 | 2 | 15.4 | 5.9 | 14.0 | 45 | 60 | 34 | | Oil, washed with methanol; yields sticky material. |
| 24 | 50 | 2 | 15.4 | 10.00 | 10.80 | 45 | 60 | 12 | | Do. |
| 25 | 50 | 2 | 15.4 | 5.05 | 5.90 | 60 | 15 | ~100 | 1.37 | Elastic, thermoplastic material, M.P. ~220° C., easily soluble in chloroform. Anal.—Found: C, 83.74; H, 8.68. Calcd. from monomer mixture: C, 84.60; H, 8.77. |
| 26 | 50 | 2 | 15.4 | 8.30 | 2.80 | 60 | 15 | | | Oil. |
| 27 | 50 | 5 | 15.4 | 2.00 | 8.10 | 60 | 15 | ~100 | 0.93 | White powder, M.P. ~180° C., easily soluble in chloroform. Anal.—Found: C, 88.89; H, 8.13. Calcd. from monomer mixture: C, 88.97; H, 8.18. |
| 28 | 50 | 5 | 15.4 | 8.05 | 2.00 | 60 | 15 | ~100 | 0.73 | Thermoplastic, tough material, M.P. ~150° C., easily soluble in chloroform. Anal.—Found: C, 78.67; H, 9.29. Calcd. from monomer mixture: C, 78.94; H, 9.53. |

[1] Potassium persulfate.
[2] Lauryl mercaptan.

The following examples illustrate the copolymerization of hydronopyl acrylate with acrylonitrile. Here too, the procedure was the same as in the foregoing copolymerizations. The acrylonitrile used had a boiling point of 74–76° C. In all cases, air was removed by flushing with nitrogen. The specific recipes, conditions, and results are given in Table IV.

TABLE IV.—HYDRONOPYL ACRYLATE-ACRYLONITRILE COPOLYMERS

| Example No. | Soap A, ml. | Initiator, ml.[1] | Modifier, mg.[2] | Hydronopyl Acrylate, g. | Acrylonitrile, g. | Temp., °C. | Time, Hrs. | Conversion, Percent | Viscosity, $\eta 25$ | Remarks |
|---|---|---|---|---|---|---|---|---|---|---|
| 29 | 50 | 2 | 15.4 | 10.75 | 10.45 | 45 | 60 | | | Oil. |
| 30 | 50 | 10 | 15.4 | 10.15 | 10.05 | 45 | 12 | 93 | | Swells with chloroform, powder, decomposes at ~210° C. Anal.—Found: N, 13.07%. Calcd. from monomer ratio: N, 13.14%. |
| 31 | 50 | 2 | 15.4 | 8.05 | 2.55 | 60 | 24 | | | Oil. |
| 32 | 50 | 10 | 15.4 | 2.00 | 8.05 | 60 | 15 | 100 | | Swells with chloroform, powder, decomposes at ~180° C. |
| 33 | 50 | 10 | 15.4 | 8.30 | 2.00 | 60 | 15 | 100 | 1.17 | Thermoplastic material, decomposes 100° C., partially soluble in chloroform. Anal.—Found: N, 3.88%=14.7% acrylonitrile in the polymer (19.4% in the monomer mixture). |

[1] Potassium persulfate.
[2] Lauryl mercaptan.

TERPOLYMERS

Example 34

Following the same procedure as for the production of the copolymers, 35 g. of soap "C," 10 ml. of initiator, 3.3 g. of hydronopyl acrylate, and 3.3 g. of styrene were placed in a polymerization bottle which was flushed with nitrogen for 60 seconds. 3.3 g. of butadiene were then added and the mixture was heated to 50° C. for 22 hours, producing a polymer of 61% conversion. The product was mixed with 10% sulfur and vulcanized at 130° C. for four hours. The resulting product was an elastic material.

Example 35

29.83 grams of hydronopyl acrylate, 31.32 g. acrylonitrile and 15.22 g. butadiene (40:40:20 weight percent), were copolymerized under nitrogen with 165 g. rosin soap B (3% solution pH=10.5), 37.5 ml. potassium persulfate (3% solution) and 1.155 g. lauryl mercaptan at 60° C. for 2 hrs. 20 ml. antioxidant were added and the emulsion was coagulated with 150 ml. sodium chloride-coagulant. The polymer was washed with water, dried, washed for several hours with methanol (3 times replaced) and dried over calcium chloride and paraffin under vacuum for several days. Yield 55.5 g.; 73% conversion.

Viscosity:
$t_{sample}$=28.3 sec.
$t_{HCCl_3}$=21.4 sec.
$c$=0.026 g./10 ml. chloroform solution
$\eta_{25°}$=1.1

Example 36

29.51 g. hydronopyl acrylate 29.78 g. acrylonitrile, and 29.60 g. butadiene (33:33:33 weight percent were copolymerized under nitrogen with 320 g. of rosin soap B (3% solution) and 1.386 g. lauryl mercaptan at 60° C. for 2 hrs. 25 ml. antioxidant were added and the emulsion was coagulated with 180 ml. sodium chloride coagulant. The polymer was washed with water, dried, washed for a couple of hours with methanol (3 times replaced) and dried over calcium chloride and paraffin under vacuum for several days. Yield 73 g.; 82% conversion.

Viscosity:
$t_{sample}$=26.9 sec.
$t_{HCCl_3}$=21.4 sec.
$c$=0.0246 g./10 ml. chloroform solution
$\eta_{25°}$=0.93.

Example 37

39.98 g. of hydronopyl acrylate 19.98 g. of acrylonitrile and 39.94 g. butadiene (40, 20, 40 weight percent were

TABLE V.—HYDRONOPYL ACRYLATE-ACRYLONITRILE-BUTADIENE TERPOLYMERS

| Example No. | Soap g. | Soap Kind | Initiator, ml. | Modifier, mg. | Hydronopyl acrylate, g. | Acrylonitrile, g. | Butadiene, g. | Temp., °C. | Time, Hrs. | Conversion, Percent | Viscosity $\eta 25$ | Remarks |
|---|---|---|---|---|---|---|---|---|---|---|---|---|
| 38 | 35 | B | 10 | | 4.13 | 3.93 | 1.42 | 50 | 18 | ~100 | | Rubbery material, swells with chloroform. |
| 39 | 35 | B | 10 | | 3.89 | 3.79 | 1.35 | 50 | 18 | ~100 | | Rubbery with low tensile strength, swells with chloroform. |
| 40 | 35 | B | 10 | | 3.91 | 3.77 | 2.06 | 50 | 18 | 94 | 0.66 | Tough, rubbery material, soluble in chloroform. Anal.—Found: C, 76.05; H, 8.80; N, 7.98. Calcd. from monomer mixture: C, 75.43; H, 8.58; N, 10.22. |
| 41 | 35 | B | 2 | 15.4 | 4.10 | 4.16 | 2.03 | 50 | 15.5 | 86 | | Plastic material, wells with chloroform. Sample mixed with 10% sulfur and activated carbon and vulcanized for 5 hrs. at 130°, yielding a rubber with fairly high tensile strength. |
| 42 | 35 | B | 2 | 30.8 | 2.97 | 2.69 | 2.70 | 50 | 15.5 | ~100 | 0.55 | Plastic-elastic material, soluble in chloroform, vulcanized with 5% sulfur and 10% activated carbon for 6 hrs. at 130°, yielding a rubber with fair tensile strength. |
| 43 | 35 | B | 2 | 30.8 | 3.80 | 3.81 | 1.90 | 50 | 8 | 85 | 0.90 | Not too tough; partially soluble in chloroform. |
| 44 | 35 | B | 2 | 30.8 | 3.96 | 1.62 | 3.97 | 50 | 8 | 99 | 1.17 | Tough material; partially soluble in chloroform. |
| 45 | 35 | B | 2 | 30.8 | 3.89 | 1.60 | 3.92 | 50 | 15 | ~100 | | Tough material; swells with chloroform. |
| 46 | 35 | B | 5 | 154 | 3.95 | 4.02 | 3.09 | 60 | 1.5 | 84 | 1.65 | Tough, elastic material, easily soluble in chloroform; the large amount of modifier is not completely emulsified. Sample vulcanized with 5% of sulfur and 10% of activated carbon for 13 hrs. at 130°, yielding a rubber with fair tensile strength. |
| 47 | 35 | B | 5 | 154 | 3.97 | 3.89 | 2.01 | 60 | 1.5 | 83 | 1.30 | Elastic, easily soluble in chloroform. Sample vulcanized with 5% of sulfur and 10% of activated carbon for 13 hrs. at 130°, yielding a rubber with fair tensile strength. | copolymerized under nitrogen with 350 g. of rosin soap B (3% solution, pH=10.5), 50 ml. potassium persulfate (3% solution) and 0.770 g. lauryl mercaptan at 60° C. for 2½ hrs. 30 ml. antioxidant were added and the emulsion was coagulated with 200 ml. sodium chloride coagulant. The polymer was washed with water, dried, washed for several hours with methanol (3 times replaced), and dried over calcium chloride and paraffin under vacuum for several days. Yield 87 g.; 87% conversion.

Viscosity:

$t_{sample}$=29.3 sec.
$t_{HCCl_3}$=21.4 sec.
$c$=0.0266 g./10 ml. chloroform solution
$\eta_{25°}$=1.2

Using the same procedures as in Examples 35, 36, and 37, additional terpolymers were prepared using the proportions and conditions shown in Table V.

Samples of the terpolymers obtained in Examples 35, 36, 37 were vulcanized for 30 minutes at 152° C. and the swelling data and stress-strain characteristics were determined for the resulting gum stocks. For purposes of comparison, a butadiene-acrylonitrile copolymer, containing about 31% acrylonitrile was used as a control. The results are summarized in the following tables:

TABLE VI.—SOLVENT RESISTANCE TESTS

|  | Soluble in MEK [1] | Swell in MEK (g. MEK/ g. gel) |
|---|---|---|
|  | Percent |  |
| Control | 2 | 3.5 |
| Ex. 35 | 22 | 4.8 |
| Ex. 36 | 14 | 3.6 |
| Ex. 37 | 10 | 3.2 |

[1] Methyl ethyl ketone.

TABLE VII.—TENSILE TESTS

|  | 100% Modulus | 300% Modulus | At Break | |
|---|---|---|---|---|
|  |  |  | Elongation, Percent | Tensile (p.s.i.) |
| Control | 140 | 320 | 350 | 340 |
| Ex. 35 | 70 | 185 | 480 | 475 |
| Ex. 36 | 115 | 325 | 450 | 825 |
| Ex. 37 | 100 | 250 | 400 | 430 |

The vulcanization recipe used with samples 35, 36 and 37 to give cured gum stock is as follows:

|  | Parts |
|---|---|
| Raw polymer | 100 |
| Zinc oxide | 5 |
| Sulfur | 1.75 |
| Captax | 1.75 |
| Stearax | 1.75 |
| Tetramethyl thiuram monosulfide | 0.2 |

We claim:

1. Hydronopyl acrylate.
2. The process for producing hydronopyl acrylate which comprises reacting hydronopyl with about an equimolar amount of a compound selected from the group consisting of acrylyl chloride and acrylic acid in an inert solvent, and separating and recovering hydronopyl acrylate from the reaction mixture.
3. The process for producing hydronopyl acrylate which comprises reacting hydronopyl with about an equimolar amount of acrylyl chloride in the presence of an inert organic solvent and an amine, adding sufficient water after the reaction to dissolve the amine hydrochloride formed during the reaction, then washing the reaction mixture with an aqueous medium, and recovering crude hydronopyl acrylate.
4. The process of claim 3 wherein the inert organic solvent is diethyl ether and the amine is dimethylaniline.
5. The process for producing hydronopyl acrylate which comprises reacting hydronopyl with about an equimolar amount of acrylyl chloride in the presence of an inert organic solvent and an amine, adding sufficient water to the reaction mixture to dissolve the amine hydrochloride formed during the reaction, then washing the reaction mixture with an aqueous medium, drying the washed reaction mixture, purifying the dried crude hydronopyl acrylate by storing over sodium, and then distilling to recover hydronopyl acrylate.
6. The process for producing hydronopyl acrylate which comprises reacting hydronopyl with about an equimolar amount of acrylic acid in the presence of an inert organic solvent, an esterification catalyst, and a polymerization inhibitor, continuing the reaction until esterfication is substantially complete, then removing the esterification catalyst, polymerization inhibitor, and any excess acrylic acid from the reaction mixture, and recovering hydronopyl acrylate from the remaining solution.
7. A homopolymer of hydronopyl acrylate.
8. The process for producing a homopolymer of hydronopyl acrylate which comprises heating hydronopyl acrylate to a temperature of about 120° C. in the presence of a peroxide catalyst.
9. The process for producing a homopolymer of hydronopyl acrylate which comprises heating hydronopyl acrylate in the presence of a peroxide catalyst.
10. The process for producing a homopolymer of hydronopyl acrylate which comprises heating hydronopyl acrylate and a peroxide catalyst in an aqueous emulsifying medium to form an emulsion of the homopolymer and recovering said homopolymer from the reaction mixture.
11. A copolymer of hydronopyl acrylate and a compound selected from the group consisting of styrene, vinyl chloride, acrylonitrile, and butadiene.
12. A copolymer of hydronopyl acrylate and styrene.
13. A copolymer of hydronopyl acrylate and vinyl chloride.
14. A copolymer of hydronopyl acrylate and acrylonitrile.
15. A copolymer of hydronopyl acrylate and butadiene.
16. The process for producing a copolymer of hydronopyl acrylate which comprises heating hydronopyl acrylate and a compound selected from the group consisting of styrene, vinyl chloride, acrylonitrile, and butadiene in the presence of a peroxide catalyst.
17. The process for producing a copolymer of hydronopyl acrylate and styrene which comprises heating hydronopyl acrylate and styrene in the presence of a peroxide catalyst.
18. The process for producing a copolymer of hydronopyl acrylate and vinyl chloride which comprises heating hydronopyl acrylate and vinyl chloride in the presence of a peroxide catalyst.
19. The process for producing a copolymer of hydronopyl acrylate and acrylonitrile which comprises heating hydronopyl acrylate and acrylonitrile in the presence of a peroxide catalyst.
20. The process for producing a copolymer of hydronopyl acrylate and butadiene which comprises heating hydronopyl acrylate and acrylonitrile in the presence of a peroxide catalyst.
21. The process for producing a copolymer of hydronopyl acrylate which comprises heating hydronopyl acrylate, a peroxide catalyst, and a compound selected from the group consisting of styrene, vinyl chloride, acrylonitrile, and butadiene in an aqueous emulsifying medium to form an emulsion of the copolymer and recovering said copolymer from the reaction mixture.
22. The process of claim 21 wherein the compound copolymerized with hydronopyl acrylate is styrene.

23. The process of claim 21 wherein the compound copolymerized with hydronopyl acrylate is vinyl chloride.

24. The process of claim 21 wherein the compound copolymerized with hydronopyl acrylate is acrylonitrile.

25. The process of claim 21 wherein the compound copolymerized with hydronopyl acrylate is butadiene.

26. A terpolymer of hydronopyl acrylate, butadiene, and a compound selected from the group consisting of styrene and acrylonitrile.

27. A terpolymer of hydronopyl acrylate, butadiene, and styrene.

28. A terpolymer of hydronopyl acrylate, butadiene, and acrylonitrile.

29. The process for producing a terpolymer which comprises heating together hydronopyl acrylate, butadiene, and a compound selected from the group consisting of styrene and acrylonitrile in the presence of a peroxide catalyst.

30. The process for producing a terpolymer which comprises heating together hydronopyl acrylate, butadiene, and styrene in the presence of a peroxide catalyst.

31. The process for producing a terpolymer which comprises heating together hydronopyl acrylate, butadiene, and acrylonitrile in the presence of a peroxide catalyst.

32. The process for producing a terpolymer which comprises heating together hydronopyl acrylate, butadiene, and a compound selected from the group consisting of styrene and acrylonitrile at a temperature of at least about 50° C. in the presence of a peroxide catalyst.

33. The process for producing a terpolymer which comprises heating together hydronopyl acrylate, butadiene, and styrene at a temperature of at least about 50° C. in the presence of a peroxide catalyst.

34. The process for producing a terpolymer which comprises heating together hydronopyl, butadiene, and acrylonitrile at a temperature of at least about 50° C. in the presence of a peroxide catalyst.

References Cited in the file of this patent

UNITED STATES PATENTS

| | | |
|---|---|---|
| 2,363,044 | Clifford | Nov. 21, 1944 |
| 2,386,661 | Clifford et al. | Oct. 9, 1945 |
| 2,427,345 | Bain | Sept. 16, 1947 |